P. B. TYLER, W. M. CHANDLER, & L. F. STANDISH,

Assignors, by mesne assignments, to G. SELDEN.

Gas Lighting Device.

No. 7,928. Reissued Oct. 23, 1877.

WITNESSES

Franck L. Outand

Alexander Mahon

Inventor:

Geo Selden

Assignee of

Tyler, Chandler & Standish

N. PETERS, PHOTO-LITHOGRAPHER, WASHINGTON, D. C.

UNITED STATES PATENT OFFICE.

GEORGE SELDEN, OF ERIE, PENNSYLVANIA, ASSIGNEE, BY MESNE ASSIGNMENTS, OF PHILOS B. TYLER, WM. M. CHANDLER, AND L. F. STANDISH.

IMPROVEMENT IN GAS-LIGHTING DEVICES.

Specification forming part of Letters Patent No. 50,860, dated November 7, 1865; Reissue No. 7,928, dated October 23, 1877; application filed October 16, 1877.

DIVISION B.

*To all whom it may concern:*

Be it known that PHILOS B. TYLER, WILLIAM M. CHANDLER, and L. F. STANDISH did invent certain new and useful Improvements in Torches for Lighting Gas, &c., of which the following is a full, clear, and exact description, reference being had to the accompanying drawings, making part of this specification, in which—

Figure 1:
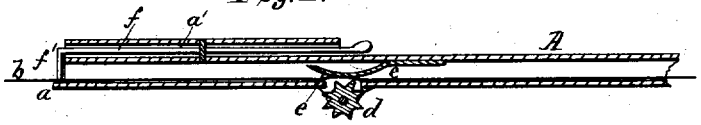
Figure 2:
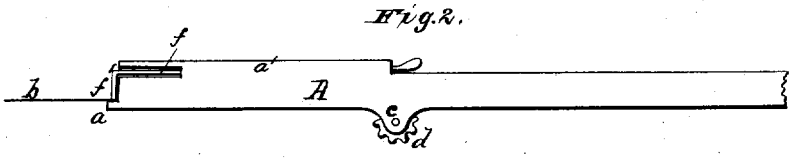
Figure 3:
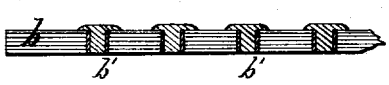
Figure 4:
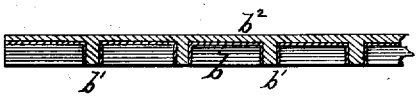
Figure 5:
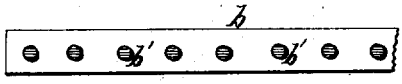
Figure 6:
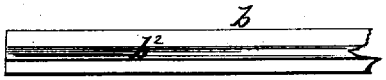

Figure 1 represents a longitudinal section through a portion of the improved torch or lighter. Fig. 2 is a side elevation of the same. Fig. 3 is a longitudinal section through the repeating-match; and Fig. 4 is a similar view of a match, showing a modification in its manufacture, whereby it is made continuous. Fig. 5 is a rear view of the match or wick, and Fig. 6 is a face view of the match shown in section in Fig. 4.

Similar letters of reference denote corresponding parts wherever used.

The invention relates to an improvement in gas-lighting torches, to the combination therewith of a continuous or repeating match adapted for use in said torches, and to the combination, with the torch or match-holder, of means for igniting the match, as hereinafter described.

In the accompanying drawings, A represents a portion of an extended tube or holder, within which the wick or tape *b*, used for lighting the gas, &c., is to be placed. This tube or holder is provided at *c* with a roughened or toothed wheel or roller, *d*, by means of which the wick or tape is fed forward or outward at will; and within the tube or holder A, directly opposite the wheel or roller *d*, is placed a spring or yielding apron, *e*, which serves to hold the wick or tape up snugly against the feed-wheel *d*, insuring the positive action of the latter on the wick or tape. The open end of the tube or holder, or that end where the wick or tape is fed out, is provided on the side opposite to the feed-wheel *d* with a short secondary tube or chamber, *a'*, in which is secured a vibrating arm or lever, *f*, pivoted, as shown, with its outer end made angular in form, or provided with a lip, *f'*, overhanging the end of tube or holder A, and brought down into contact or close proximity with the opposite wall of the tube, or with a nose-piece or extension, *a*, of said wall, upon which the wick or tube rests, and over which it is fed outward.

The wick consists of a narrow strip of paper or tape, *b*, which, by preference, is perforated at $b^1$, at regular intervals, to adapt it to receive and retain an igniting material, arranged thereon either in the form of a continuous central line or strip, as shown at $b^2$ in Figs. 4 and 6, or in spots or pellets, as shown in Fig. 3, the one constituting a continuous and the other what is termed a "repeating match."

The tape or wick, when made of other material than paper, may be saturated with stearine, adapting it to burn with a flame, or it may be saturated with any other suitable material which will cause it to burn readily, and the igniting material thereon may consist of a preparation of sulphur and phosphorus, or other suitable material or compound for the purpose, such as can be readily ignited. This continuous or repeating match is placed in the tube or holder, A, and is fed out, as required, by means of the wheel *d*, or equivalent device, until a spot or portion of the igniting material rests over the nose-piece, when, by vibrating the arm or lever *f* and moving the lip or end *f'* in contact with such igniting material, the match will be ignited, and may be used for lighting gas, and for other analogous purposes.

The match will continue to burn as long as it is projected beyond or out of the tube, and will be extinguished when it has burned down to the end of the tube or holder; or it may be withdrawn within the tube, thus cutting off the supply of air and causing it to be extinguished.

Having now described the invention, what is claimed under this division of the application, and sought to be secured by Letters Patent, is—

1. In a gas-lighter, a continuous or repeating match, in combination with an extended tube or holder.

2. In a gas-lighter, an extended tube or holder, and a continuous or repeating match, in combination with means for feeding and igniting said match.

3. In a gas-lighter, an extended tube or holder for inclosing a continuous or repeating match, provided with a lip or nose-piece, over which the match is fed, and which serves to support said match against the action of the igniting device.

GEO. SELDEN.

Witnesses:

ALEXANDER MAHON,
JOHN G. CENTER.